US007243362B2

United States Patent
Swix et al.

(10) Patent No.: US 7,243,362 B2
(45) Date of Patent: *Jul. 10, 2007

(54) SYSTEM AND METHOD FOR INSERTING ADVERTISING CONTENT IN BROADCAST PROGRAMMING

(75) Inventors: Scott R. Swix, Duluth, GA (US); Paul T. Watson, Alpharetta, GA (US); James H. Gray, Atlanta, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/218,827

(22) Filed: Sep. 2, 2005

(65) Prior Publication Data

US 2006/0010466 A1    Jan. 12, 2006

Related U.S. Application Data

(63) Continuation of application No. 10/034,654, filed on Dec. 26, 2001, now Pat. No. 6,978,470.

(51) Int. Cl.
*H04N 7/10* (2006.01)
*H04N 7/173* (2006.01)

(52) U.S. Cl. .............. 725/34; 725/42; 725/46; 725/131; 725/139

(58) Field of Classification Search ............... 725/32, 725/36, 39, 42, 46, 110, 112, 131, 132, 139, 725/34; 705/10, 14; 709/245
See application file for complete search history.

(56) References Cited

U.S. PATENT DOCUMENTS

| 5,630,204 | A | 5/1997 | Hylton et al. |
| 5,892,535 | A | 4/1999 | Allen et al. |
| 6,160,989 | A | 12/2000 | Hendricks et al. |
| 6,463,585 | B1 | 10/2002 | Hendricks et al. |
| 6,978,470 | B2 * | 12/2005 | Swix et al. .................. 725/32 |
| 2001/0049620 | A1 | 12/2001 | Blasko |
| 2002/0083441 | A1 | 6/2002 | Flickinger et al. |
| 2002/0083442 | A1 | 6/2002 | Eldering |
| 2002/0123928 | A1 | 9/2002 | Eldering et al. |
| 2002/0129368 | A1 | 9/2002 | Schlack et al. |
| 2002/0144262 | A1 | 10/2002 | Plotnick et al. |
| 2002/0178447 | A1 | 11/2002 | Plotnick et al. |

OTHER PUBLICATIONS

International Search Report, PCT/US02/38828, May. 12, 2003.

* cited by examiner

*Primary Examiner*—Kieu-Oanh Bui
(74) *Attorney, Agent, or Firm*—Myers Bigel Sibley & Sajovec, P.A.

(57) ABSTRACT

A system for inserting viewer-specific advertising content comprises a viewer device. The viewer device identifies viewer characteristics regarding the viewer. Upon receipt of advertising content, the viewer device identifies advertisements matching the viewer characteristics. The viewer device inserts the advertisements matching the viewer characteristics into broadcast content.

56 Claims, 6 Drawing Sheets

SYSTEM AND METHOD FOR INSERTING ADVERTISING CONTENT IN BROADCAST PROGRAMMING

CROSS-REFERENCE TO RELATED APPLICATION

This application is a continuation of application Ser. No. 10/034,654, filed Dec. 26, 2001, (now U.S. Pat. 6,978,470) entitled System and Method for Inserting Advertising Content in Broadcast Programming, assigned to the assignee of the present application, the disclosure of which is hereby incorporated herein by reference in its entirety as if set forth fully herein.

BACKGROUND OF THE INVENTION

1. Field of the Invention

The present invention relates to systems and methods for inserting into broadcast programming advertising content targeted to specific viewers. More specifically, the invention relates to identifying viewer characteristics and inserting into broadcast programming advertising content corresponding to the viewer characteristics.

2. Description of the Prior Art

In existing national and local network broadcast systems, advertisement insertion is controlled by cue tones. A cue-tone is an audible signal that is placed into the television program stream, typically by the content provider such as a studio to identify to local broadcasters when to insert an advertisement. Cue-tones are placed at specific points in programming streams to indicate where advertisements may be inserted—typically at the beginning and ending of shows, and at the 10, 12, 15, and 30 minute marks of a program. Cue tones also indicate the duration of the advertising break. For example, cue-tones may dictate insertion of a 15, 30, 45, 60, 90, or 120 second segment. Content providers use cue-tone generators to insert the tones into the broadcast prior to forwarding broadcast content to local broadcasters. Local broadcast operators employ cue-tone based advertising insertion systems to detect the cue-tones and insert the desired advertising. The cue tones occur a number of seconds before the advertising is to actually be inserted, allowing the automated insertion systems time to cut-over and play advertising content that is applicable to the local broadcaster's broadcast region.

Generally, existing advertising insertion systems operated by broadcast programmers are located at a centralized distribution point that sometimes is referred to as a headend. The broadcaster is limited to inserting generic advertisements that will be presented to all viewers receiving content "downstream" from this centralized distribution point. These centralized advertising insertion systems provide the ability to target viewers based on "upstream" characteristics such as the broadcast source (for example, the broadcast network) or the specific program into which the advertising content is to be inserted. For example, existing advertisement insertion systems may insert an advertisement for a program from the same provider, or advertisements specially directed at persons in the "target audience" of the program presently airing.

Applicants have recognized, however, that existing centralized insertion systems lack the capability to target viewers and viewer groups within the broadcast area. Indeed, due to the centralized nature of existing advertisement insertion systems, the systems are limited in their capability to target viewers based upon "downstream" characteristics such as, for example, the characteristics of the viewers themselves. Indeed, the capability to provide advertising geared toward individual viewer characteristics would be particularly valuable for broadcast providers such as direct to home satellite (DTH) providers whose service area typically includes a large geographic and broad demographic region. For example, it would be a great improvement in the art to match advertisements to a particular viewer based upon the viewer's age, location, viewing habits, etc. Such a system would be beneficial to viewers, broadcasters, and advertisers alike.

SUMMARY OF THE INVENTION

The present invention is directed to systems and methods for inserting viewer specific advertising content in broadcast programming. A viewer device such as, for example, a set top box (STB) located at a home or viewer location gathers data identifying the characteristics of a viewer such as, for example, the viewer's age, gender, marital status, geographic location, and viewing habits. The viewer characteristic data is used to identify advertising content corresponding to the characteristics of a viewer. The viewer device comprises a broadcast receiver for receiving broadcast content transmitted by a broadcast content provider over a broadcast network. The viewer device further comprises a broadband connection device for receiving advertising content transmitted by an advertising content server over a broadband network. Upon receiving the advertising content, the viewer device selects advertisements matching the viewers characteristics and inserts the selected advertisements into the broadcast programming. Thereafter, the viewer device transmits the broadcast content and inserted advertising content to a television for viewing at the home or viewer location.

According to an aspect of the present invention, the viewer device may gather data identifying the characteristics of a viewer by categorizing broadcast programming and recording the frequency and duration with which the viewer is tuned to broadcast programming in each category. The viewer device may also gather viewer characteristics via a program for requesting information from the viewer.

According to another aspect of the present invention, the advertising content server transmits advertising content to the viewer device, and the viewer device identifies advertising content corresponding to the characteristics of a viewer. Alternatively, the viewer device may transmit over a broadband network data identifying the characteristics of a viewer to the advertising content server, and the advertising content server may identify advertising content corresponding to the characteristics of a viewer.

According to another aspect of the present invention, advertising content can be transmitted to the viewer device and simultaneously inserted into the broadcast content in real time. Alternatively, advertising content may be stored in memory at the viewer device for insertion into the broadcast content at a later time. Cue tones may be inserted in the broadcast content to identify locations where advertising content may be inserted.

BRIEF DESCRIPTION OF THE DRAWINGS

The present invention will be better understood after reading the following detailed description of the presently preferred embodiments thereof with reference to the appended drawings, in which.

DETAILED DESCRIPTION

Figure 1:
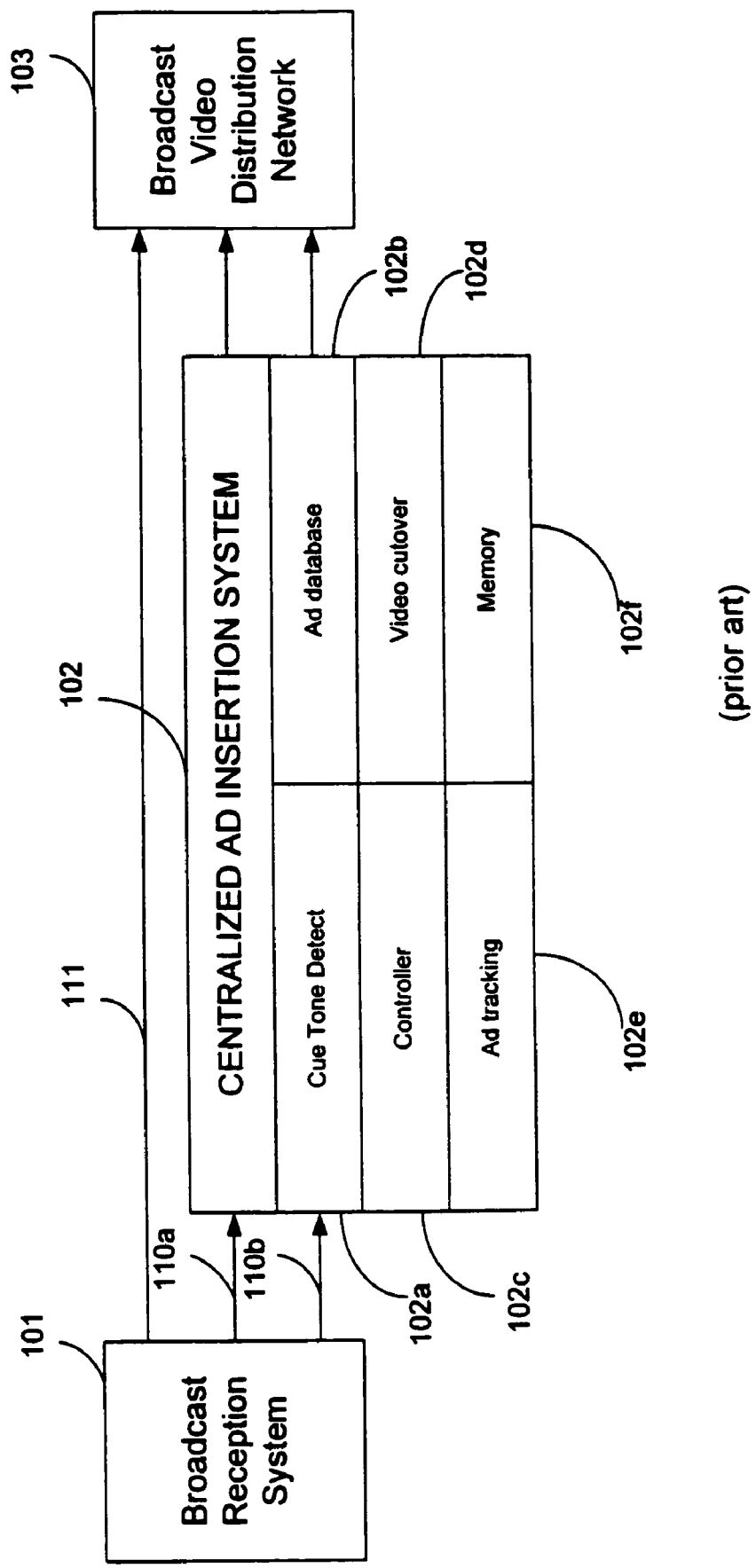
FIG. 1 illustrates an existing centralized ad insertion system.

Systems and methods for advertisement insertion in accordance with the invention are described below with reference to FIGS. 1–6. Those skilled in the art will readily appreciate that the description given herein with respect to those figures is for explanatory purposes only and is not intended in any way to limit the scope of the invention. Throughout the description, like reference numerals will refer to like elements in the respective figures.

FIG. 1 illustrates an existing centralized advertisement insertion system. Generally, broadcast video streams that are transmitted from broadcast sources such as production studios are received at broadcast reception system 101. If advertisement is to be inserted, the video stream is sent through ad insertion system 102. Alternatively, a video stream may bypass ad insertion system 102 if no advertisement insertion is to take place. For example, video streams 110a and 110b are sent through the ad insertion system, while video stream 111 bypasses the ad insertion system. After an ad has been inserted or the ad insertion process has been bypassed, video streams are received by broadcast video distribution network 103 for transmission over a broadcast network such as a DTH satellite network or a cable network.

Typically, ad insertion system 102 comprises several components. Cue tone detector 102a identifies locations where advertising content is to be inserted. Ad database 102b stores in memory advertisement that may be inserted. Controller 102c plans what ads are to be run at what intervals. Video cutover 102d temporarily blocks the incoming video stream, plays the advertising to be inserted, and then cuts back to the incoming video stream. Ad tracking system 102e records which ads are inserted for reporting and billing purposes. Ad duration database 102f stores in memory the duration of the ads in ad database 102b.

Figure 2:
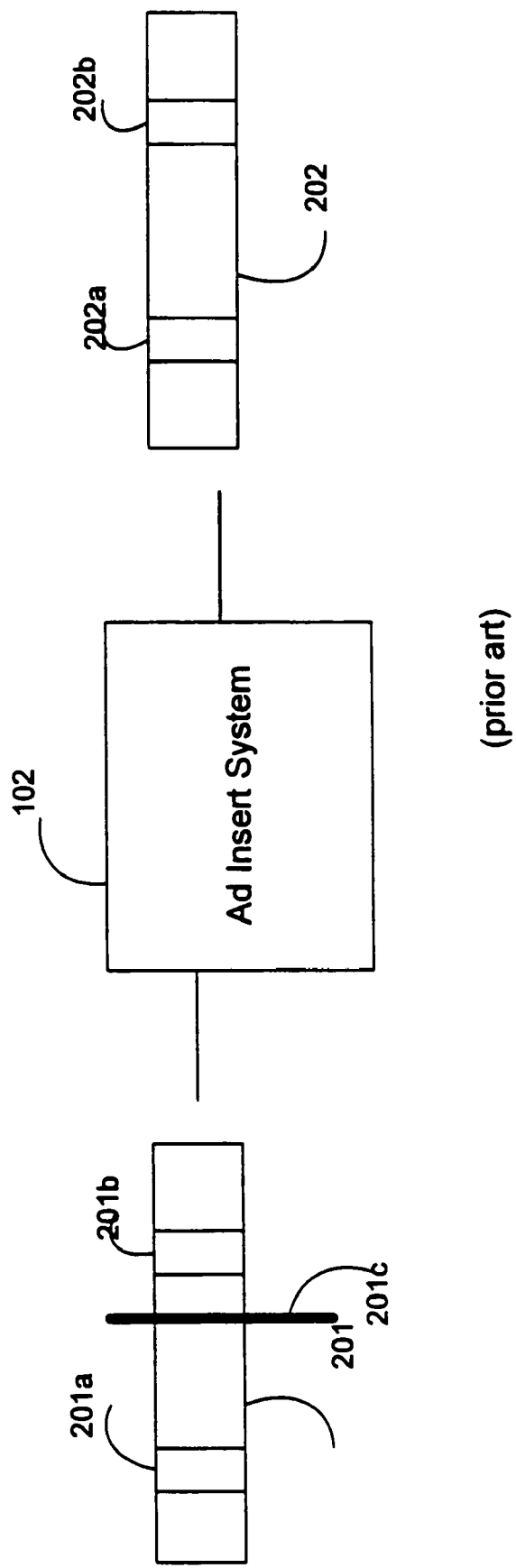
FIG. 2 illustrates a video stream with generic ads and cue tones, before and after insertion of advertisements.

FIG. 2 illustrates components of a typical video stream before and after processing by an advertisement insertion system. A shown, original video stream 201 contains locations 201a and 201b in which advertisements may be inserted. Video stream 201 also contains cue tone 201c, which serves to identify locations where advertising content may be inserted by ad insertion system 102. Video stream 201 is converted to video stream 202 upon passing through system 102. Video stream 202 contains locations 202a and 202b corresponding to locations 201a and 201b of video stream 201. As shown, location 202a is identical to location 201a as no ad has been inserted. However, at location 202b an ad has been inserted.

The advertisement insertion system of FIG. 1 provides for the centralized insertion of advertisements prior to broadcast. Accordingly, advertisements are typically selected based upon "upstream" characteristics such as the broadcast source or the identity of the presently airing program. Such systems provide little or no capacity to tailor advertisements to specific viewers.

Figure 3:
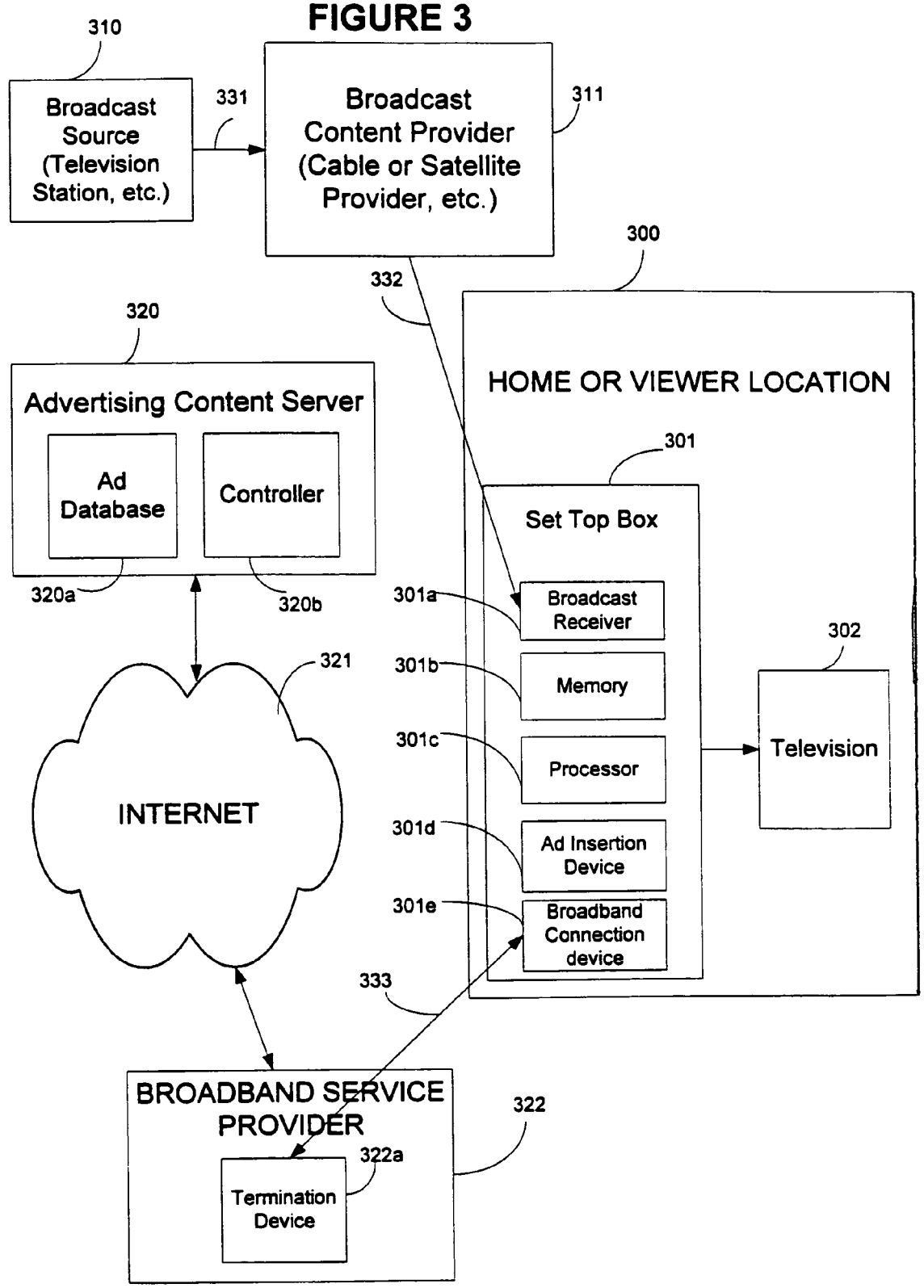
FIG. 3 is a block diagram of an illustrative advertisement insertion system in accordance with the present invention.

FIG. 3 is a block diagram of a system for viewer specific advertisement insertion in accordance with the present invention. As shown, home or viewer location 300 contains a viewer device 301 that provides a video input to television 302. Viewer device 301 may be, for example, a set top box, a home gateway, a personal computer, or any electronic device capable of receiving, storing, and processing video signals. Generally, viewer device 301 receives broadcast content from broadcast service provider 311 over communication channel 332. Viewer device 301 also receives advertising content from broadband service provider 322 over communication channel 333. Viewer device 301 operates to insert advertisements specific to the viewer's characteristics as described below in connection with FIGS. 4–6.

Viewer device 301 comprises several components. Broadcast receiver 301a enables viewer device 301 to receive programming transmitted from broadcast content provider 311, and may be for example a DTH satellite receiver, cable receiver, or the like. Memory 301b stores input data such as data identifying the viewing characteristics of a viewer. Processor 301c enables the viewer device to gather input data such as data identifying the viewing characteristics of the operator. Ad insertion system 301d performs ad insertion tasks similar to ad insertion system 102 discussed previously. Broadband connection device 301e provides connectivity to broadband data network 322 and may be, for example, a modem device for communication over a digital subscriber line (DSL) or cable modem connection.

Broadcast source 310 which may be, for example, a television broadcast corporation or other source of broadcast programming, supplies broadcast content to broadcast content provider 311. Content such as, for example, TBS, The Discovery channel, and ESPN may be downloaded from source 310 to a content provider 311 via a satellite link, for example. Broadcast provider 311 broadcasts content to viewers and may be, for example, a DTH satellite provider or a cable television provider.

Advertising content server 320 comprises an ad database 320a that stores in memory ads to be inserted. Server 320 further comprises a controller 320b for selecting and queuing advertising content to be transmitted to the viewer device. In one embodiment of the illustrative system as described in detail in connection with FIG. 4, advertising content server 320 simply transmits advertisements through broadband service provider 322 to viewer device 301 where advertisements are selected based upon viewer characteristics. According to another embodiment of the illustrative system as described in detail in connection with FIG. 5, advertising content server 320 receives viewer characteristics from viewer device 301 via broadband service provider 322. Thereafter, advertising content server 320 selects advertisement matching the viewer characteristics and forwards only these matching advertisements to viewer device 301 for insertion.

Broadband service provider 322 provides a broadband connection between viewer device 301 and content server 320. Broadband service provider may be, for example, a DSL service provider, a cable internet service provider, or the like. Generally, service provider 322 receives high speed connections 332 from viewer device 301 and provides access to content server 320 via the internet 321. As shown, service provider 322 comprises a termination device 322a for receiving a communication line from viewer device 301. Device 322b may be, for example, a DSL modem.

Figure 4:
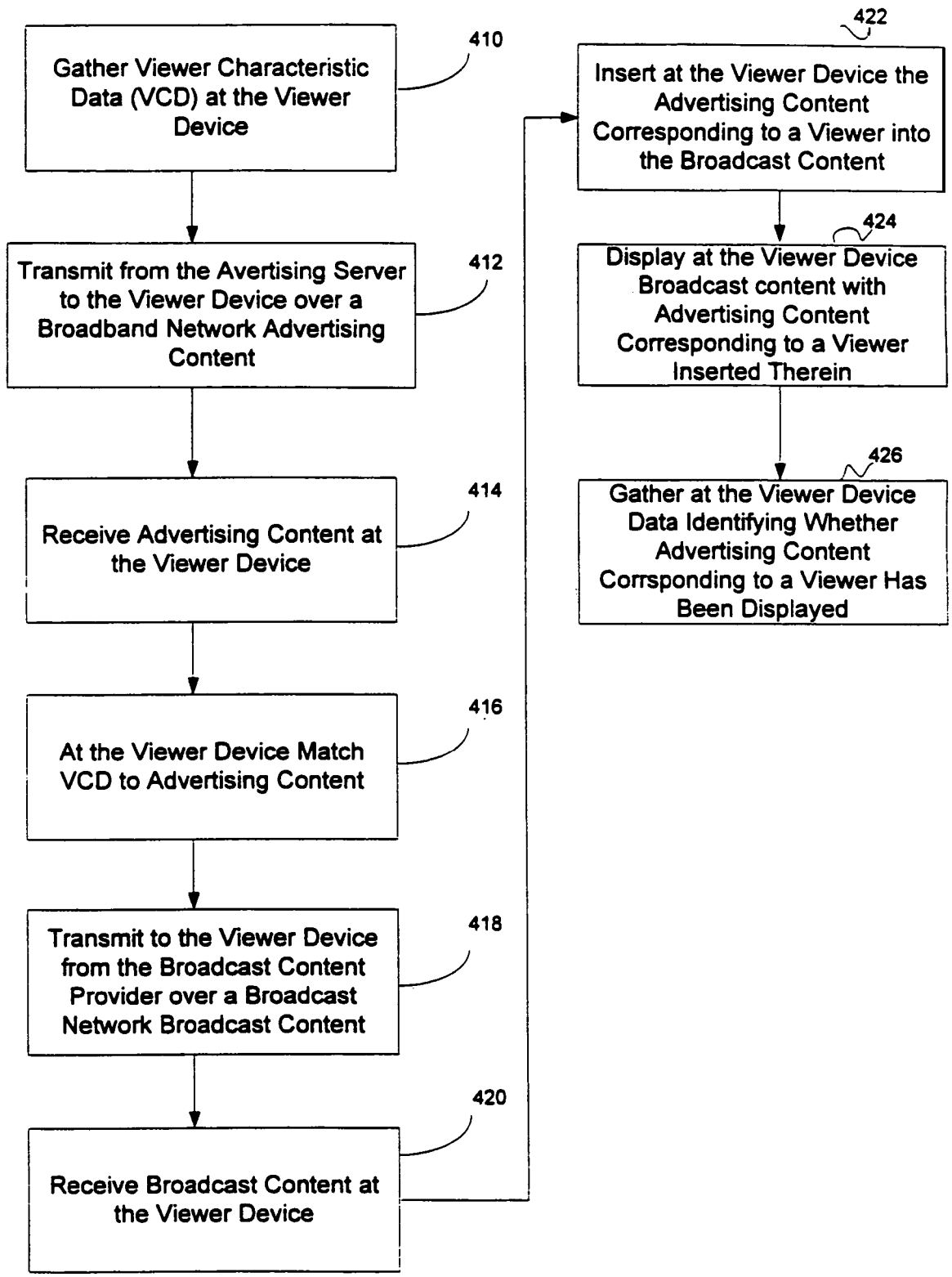
FIG. 4 is a flow chart of an illustrative method for advertisement insertion in accordance with an aspect of the invention.

FIG. 4 is a flow chart of a method for inserting viewer specific advertisements in broadcast content according to an aspect of the invention. At step 410 viewer device 301 gathers data identifying the characteristics of the viewer or operator of the viewer device 301. Data identifying the characteristics of a viewer may consist of the viewer's age, address, marital status, income, interests, hobbies, purchasing habits, television viewing habits, or any other information about the viewer that is valuable to an advertiser. Data may be collected via an application executed by processor 301c that prompts the viewer for the information. Data identifying the characteristics of a viewer may also be obtained by categorizing broadcast programming, and recording at the viewer device the frequency and duration with which the viewer is tuned to broadcast programming in each category.

At step 412, advertising content server 320 transmits advertising content to the viewer device over broadband network 322. At step 414, the advertising content is received at viewer device 301.

At step 416, viewer device 301 identifies advertising content corresponding to the characteristics of a viewer. This step may be performed by matching viewer characteristics to data identifying the target audience for advertising content. For example, if viewer characteristic data indicates the viewer is a male between the ages of 18 and 25, device 301 selects advertisements directed to this segment of society. Device 301 may also select advertisements based upon the geographic location of the viewer. For example, device 301 may select skiing ads for viewers located in Colorado and surfboard ads for viewers located in Hawaii.

At step 418, broadcast content is transmitted from the broadcast content provider to viewer device 301 over a broadcast network. At step 420, broadcast content is received at viewer device 301.

At step 422, viewer device 301 inserts advertising content corresponding to the characteristics of the viewer into the broadcast content. Insertion of advertising content at step 422 may occur in real time, simultaneously with the reception of the advertising content in step 414. Alternatively, advertising content may also be stored at viewer device 301 in memory 301b for insertion at a later time. As discussed previously in connection to FIG. 2, cue tones may be used to identify locations where advertising content may be inserted.

At step 424, viewer device 301 displays on television 302 the broadcast content with the advertising content corresponding to the characteristics of the viewer inserted therein. At step 426, viewer device 301 gathers data identifying whether advertising content matching the characteristics of the viewer has been displayed. This step comprises determining whether a viewer remains tuned to a channel during an advertisement. A record may be kept at the viewer device, and the viewer device may transmit the record to a system that tracks advertisement viewing. Advertisers may use advertisement display data to gather information about which and how many viewers out of the entire group of broadcast content viewers are actually viewing advertising content. Content providers may, therefore, charge advertisers a premium for advertisement display data.

The method for inserting viewer specific advertisements in broadcast content discussed above with reference to FIG. 4 protects viewer privacy because viewer characteristic data is confined to the viewer device and is not sent outside the viewer's home or viewing location.

Figure 5:
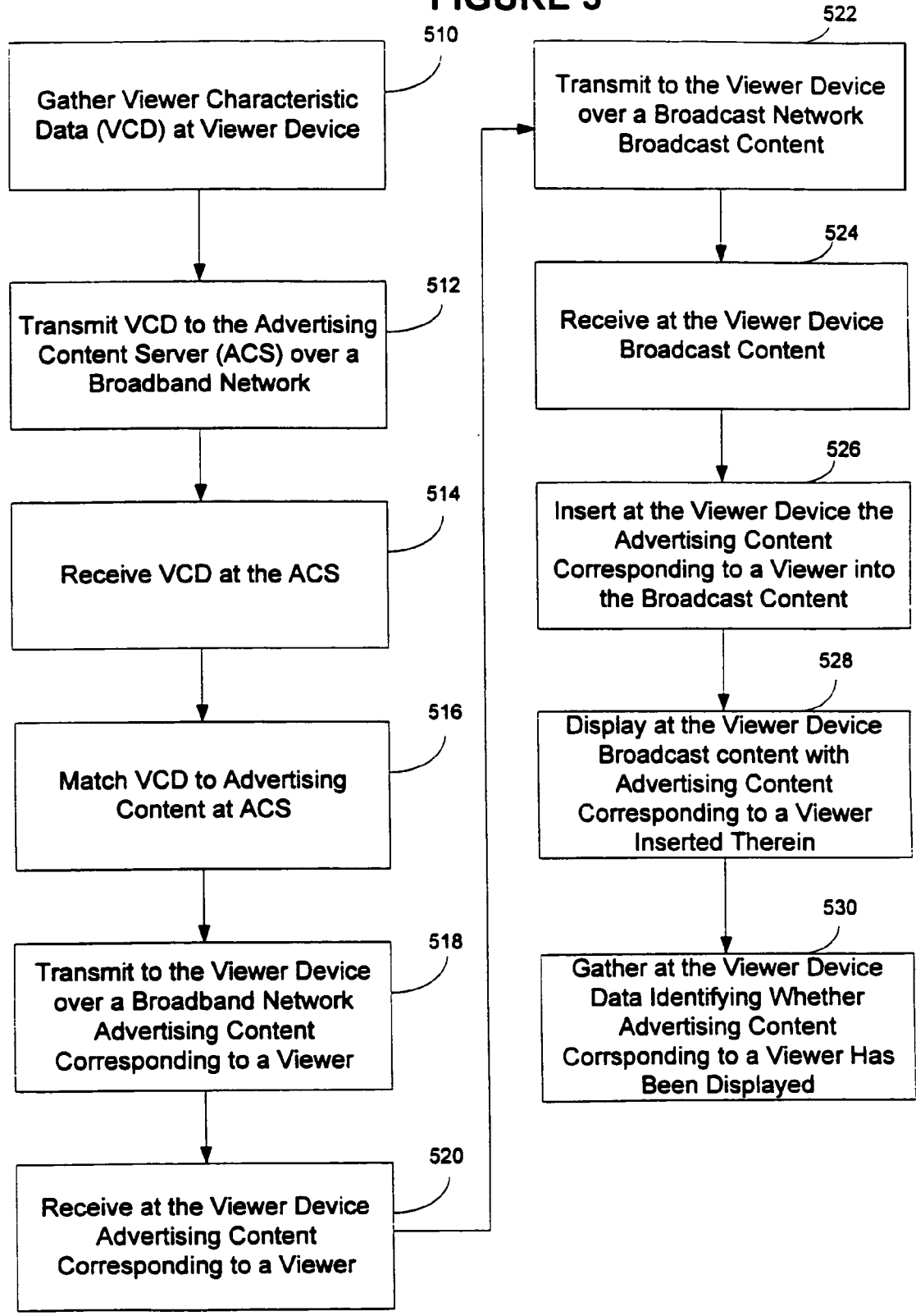
FIG. 5 is a flow chart of an illustrative method for advertisement insertion in accordance with an aspect of the invention.

FIG. 5 is a flow chart of an alternative method for inserting viewer specific advertisements in broadcast content according to an aspect of the invention. At step 510 viewer device 301 gathers data identifying the characteristics of a viewer in a manner similar to that described above in connection with step 410. At step 512, viewer device 301 transmits the data identifying characteristics of a viewer to advertising content server 320 over broadband network 333. At step 514, data identifying characteristics of the viewer is received at advertising content server 320.

At step 516, advertising content server 320 identifies advertising content corresponding to the characteristics of a viewer. At step 518, advertising content corresponding to the characteristics of a viewer is transmitted from advertising server 320 to viewer device 301 over broadband network 333. At step 520, advertising content corresponding to the characteristics of a viewer is received at viewer device 301.

At step 522, broadcast content is transmitted from broadcast content provider 311 to viewer device 301 over broadcast network 332. At step 524, the broadcast content is received at viewer device 301. At step 526, viewer device 301 inserts advertising content corresponding to the characteristics of a viewer into the broadcast content. Insertion of advertising content in step 526 may occur in real time, simultaneously with the reception of the advertising content in step 520. Alternatively, advertising content may be stored at viewer device 301 in memory 301c for insertion at a later time.

At step 528, viewer device 301 displays on television 302 the broadcast content with the advertising content corresponding to the characteristics of the viewer inserted therein. At step 530, viewer device 301 gathers data identifying whether advertising content matching the characteristics of the viewer has been displayed.

Figure 6:
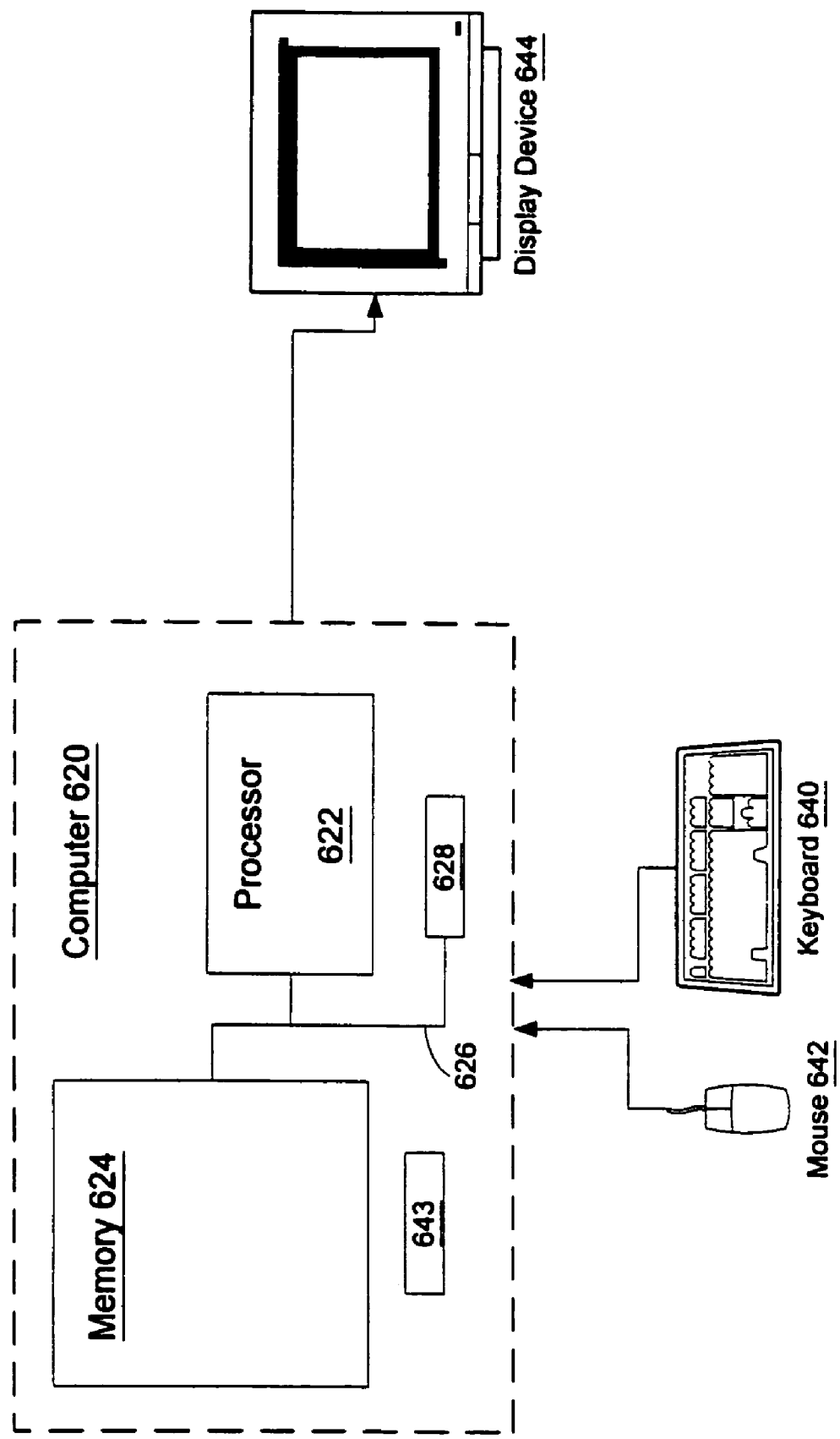
FIG. 6 is a high level diagram of an exemplary computer network for communicating electronic data.

Advertising content server 320 and viewer device 301 may comprise an appropriately programmed computing device. FIG. 6 is a block diagram of a generic computing system suitable for use in a system in accordance with the present invention. As shown, computing device 620 includes processing unit 622, system memory 624, and system bus 626 that couples various system components including system memory 624 to the processing unit 622. The system memory 624 might include read-only memory (ROM) and random access memory (RAM). The system might further include hard-drive 628, which provides storage for computer readable instructions, data structures, program modules and other data. A user may enter commands and information into the computer 620 through input devices such as a keyboard 640 and pointing device 642 which may be, for example, a mouse or remote control. A monitor 644 or other type of display device is also connected to the system for output. Communications device 643, which in one embodiment may be a modem, provides for communications over a network such as, for example, broadband network 333 and the internet 321. Processor 622 can be programmed with instructions to interact with other computing systems so as to perform the algorithms described below with reference to FIGS. 4 and 5. The instructions may be received from networks 321 and 333 or stored in memory 624 and/or hard drive 628. Processor 622 may be loaded with any one of several computer operating systems such as Windows NT, Windows 2000, or Linux.

Those skilled in the art understand that computer readable instructions for implementing the above described processes, such as those described with reference to FIGS. 4 and 5, can be generated and stored on one of a plurality of computer readable media such as a magnetic disk or CD-ROM. Further, a computer such as that described with reference to FIG. 6 may be arranged with other similarly equipped computers in a network and loaded with computer readable instructions for performing the above described processes. Specifically, referring to FIG. 6, microprocessor 622 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described as being used to insert advertising content transmitted over a DSL network into broadcast content transmitted over a DTH satellite network, the invention might also be used to insert advertising content transmitted over any broadband network into advertising content transmitted over any broadcast network. Furthermore, viewer characteristic data may be any information that is valuable to a viewer and is not intended to be limited to the examples listed in this section. Accordingly, reference should be made to the appended claims as indicating the scope of the invention.

What is claimed:

1. A method for inserting content into broadcast programming comprising:
    gathering at an end user device, data identifying characteristics of an end user of the end user device, wherein the data that is gathered is confined to the end user device;
    receiving at the end user device, content for insertion within the broadcast programming;
    identifying at the end user device, selected content for insertion within the broadcast programming, wherein the selected content corresponds to the data identifying characteristics of an end user;
    receiving at the end user device, broadcast programming;
    inserting into the broadcast programming that is received at the end user device, the selected content that corresponds to the data identifying characteristics of an end user, for presentation by the end user device; and
    gathering at the end user device, data identifying that the selected content that corresponds to the data identifying characteristics of an end user was presented by the end user device.

2. A method according to claim 1 wherein the content for insertion comprises advertising content for insertion within the broadcast programming.

3. A method according to claim 2 wherein identifying at the end user device, selected advertising content for insertion within the broadcast programming comprises matching data identifying a target audience for the advertising content to the characteristics of the end user.

4. A method according to claim 1 wherein the end user device comprises a set top box.

5. A method according to claim 1 wherein gathering at an end user device, data identifying characteristics of an end user of the end user device, comprises gathering at an end user device, data identifying at least one of the following characteristics of an end user: age, address, gender, marital status, income, interests, hobbies, purchasing habits, location and broadcast viewing habits.

6. A method according to claim 1 wherein gathering at an end user device, data identifying characteristics of an end user of the end user device, comprises:
    identifying a plurality of categories into which broadcast programming can be grouped; and
    determining a frequency and/or duration with which an end user is tuned to broadcast programming in the plurality of categories.

7. A method according to claim 1 wherein receiving at the end user device, broadcast programming comprises receiving at the end user device, satellite and/or cable broadcast programming.

8. A method according to claim 1 wherein receiving at the end user device, content for insertion within the broadcast programming comprises receiving at the end user device from a broadband network, content for insertion within the broadcast programming.

9. A method according to claim 1 wherein receiving at the end user device, content for insertion within the broadcast programming is performed prior to receiving at the end user device, broadcast programming and wherein the method further comprises storing at the end user device, the content for insertion within the broadcast programming.

10. A method according to claim 1 wherein receiving at the end user device, content for insertion within the broadcast programming is performed simultaneously with inserting into the broadcast programming that is received at the end user device, the selected content that corresponds to the data identifying characteristics of an end user, for presentation byte end user device.

11. A method according to claim 1:
    wherein receiving at the end user device, broadcast programming comprises receiving at the end user device, broadcast programming including cue tones identifying locations where content may be inserted; and
    wherein inserting into the broadcast programming that is received at the end user device, the selected content that corresponds to the data identifying characteristics of an end user, is performed in response to the cue tones.

12. A method according to claim 1 wherein gathering at the end user device, data identifying that the selected content that corresponds to the data identifying characteristics of an end user was presented by the end user device is followed by:
    transmitting from the end user device, the data identifying that the selected content that corresponds to the data identifying characteristics of an end user was presented by the end user device.

13. A method for inserting content into broadcast programming comprising:
    gathering at an end user device, data identifying characteristics of an end user of the end user device, wherein the data that is gathered is confined to the end user device;
    inserting into broadcast programming that is received at the end user device, selected content that corresponds to the data identifying characteristics of the end user, and
    gathering at the end user device, data identifying that the selected content that corresponds to the data identifying characteristics of an end user was presented.

14. A method according to claim 13 wherein the content for insertion comprises advertising content for insertion within the broadcast programming.

15. A method according to claim 13 wherein the end user device comprises a set top box.

16. A method according to claim 13 wherein gathering at an end user device, data identifying characteristics of an end user of the end user device, comprises gathering at an end user device, data identifying at least one of the following characteristics of an end user: age, address, gender, marital status, income, interests, hobbies, purchasing habits, location and broadcast viewing habits.

17. A method according to claim 13 wherein gathering at an end user device, data identifying characteristics of an end user of the end user device, comprises:
   identifying a plurality of categories into which broadcast programming can be grouped; and
   determining a frequency and/or duration with which an end user is timed to broadcast programing in the plurality of categories.

18. A method according to claim 13 wherein the broadcast programming comprises satellite and/or cable broadcast programming.

19. A method according to claim 13 wherein gathering at the end user device, data identifying that the selected content that corresponds to the data identifying characteristics of an end user was presented:
   transmitting from the end user device the data identifying that the selected content that corresponds to the data identifying characteristics of an end user was presented.

20. A method for tracking presentation of broadcast programming to end users comprising:
   receiving from a plurality of end user devices, respective data identifying that selected content that corresponds to data identifying characteristics of a respective end user of a respective end user device has been presented by the respective end user device, without receiving the data identifying characteristics of a respective end user; and
   gathering information concerning presentation of the selected content among the plurality of end user devices from the respective data identifying that selected content that corresponds to data identifying characteristics of a respective end user of a respective end user device has been presented by the respective end user device, to track presentation of the selected content by the plurality of end user devices.

21. A method according to claim 20 wherein the content for insertion comprises advertising content for insertion within the broadcast programming.

22. A method according to claim 20 wherein the end user device comprises a set top box.

23. A method according to claim 20 wherein the respective data identifying characteristics of a respective end user of a respective end user device comprises at least one of the following characteristics of a respective end user: age, address, gender, marital status, income, interests, hobbies, purchasing habits, location and broadcast viewing habits.

24. A method according to claim 20 wherein the broadcast programming comprises satellite and/or cable broadcast programming.

25. A system for inserting content into broadcast programming comprising:
   an end user device that is configured to gather the data identifying characteristics of an end user of the end user device, wherein the data that is gathered is confined to the end user device, to receive content for insertion within the broadcast programing, to identify selected content for insertion within the broadcast programming, wherein the selected content corresponds to the data identifying characteristics of an end user, to receive broadcast programming and to insert into the broadcast programming that is received at the end user device, the selected content that corresponds to the data identifying characteristics of an end user, for presentation by the end user device;
   the end user device being further configured to gather data identifying that the selected content that corresponds to the data identifying characteristics of an end user was presented by the end user device.

26. A system according to claim 25 wherein the content for insertion comprises advertising content for insertion within the broadcast programming.

27. A system according to claim 26 wherein the end user device is configured to identify selected advertising content for insertion within the broadcast programming by matching data identifying a target audience for the advertising content to the characteristics of the end user.

28. A system according to claim 25 wherein the end user device comprises a set top box.

29. A system according to claim 25 wherein the data identifying characteristics of an end user of the end user device, comprises data identifying at least one of the following characteristics of an end user: age, address, gender, marital status, income, interests, hobbies, purchasing habits, location and broadcast viewing habits.

30. A system according to claim 25 wherein the end user device is configured to gather data identifying characteristics of an end user of the end user device, by identifying a plurality of categories into which broadcast programming can be grouped, and determining a frequency and/or duration with which an end user is tuned to broadcast programming in the plurality of categories.

31. A system according to claim 25 wherein the broadcast programming comprises satellite and/or cable broadcast programming.

32. A system according to claim 25 wherein the end user device is configured to receive content for insertion within the broadcast programming from a broadband network.

33. A system according to claim 25:
   wherein the broadcast programming includes cue tones identifying locations where content may be inserted; and
   wherein the end user device is configured to insert into the broadcast programming the selected content that corresponds to the data identifying characteristics of an end user, in response to the cue tones.

34. A system according to claim 25 wherein the end user device is further configured to transmit the data identifying that the selected content that corresponds to the data identifying characteristics of an end user was presented by the end user device.

35. A system for inserting content into broadcast programming comprising:
   an end user device that is configured to gather data identifying characteristics of an end user of the end user device, wherein the data that is gathered is confined to the end user device, and to insert into broadcast programming that is received, selected content that corresponds to the data identifying characteristics of the end user, for presentation by the end user device;
   the end user device further configured to gather data identifying that the selected content that corresponds to the data identifying characteristics of an end user, was presented by the end user device.

36. A system according to claim 35 wherein the content for insertion comprises advertising content for insertion within the broadcast programming.

37. A system according to claim 35 wherein the end user device comprises a set top box.

38. A system according to claim 35 wherein data identifying characteristics of an end user of the end user device, comprises data identifying at least one of the following characteristics of an end user: age, address, gender, marital status, income, interests, hobbies, purchasing habits, location and broadcast viewing habits.

39. A system according to claim 35 wherein the end user device is configured to gather data identifying characteristics of an end user of the end user device, by identifying a plurality of categories into which broadcast programming can be grouped, and determining a frequency and/or duration with which an end user is tuned to broadcast programming in the plurality of categories.

40. A system according to claim 35 wherein the broadcast programming comprises satellite and/or cable broadcast programming.

41. A computer program product for inserting content into broadcast programming, the computer program product comprising a computer usable storage medium having computer-readable program code embodied in the medium, the computer-readable program code executable by a computer processor comprising:
   computer-readable program code that is configured to gather at an end user device, data identifying characteristics of an end user of the end user device, wherein the data tat is gathered is confined to the end user device;
   computer-readable program code that is configured to receive at the end user device, content for insertion within the broadcast programming;
   computer-readable program code that is configured to identify at the end user device, selected content for insertion within the broadcast programming, wherein the selected content corresponds to the data identifying characteristics of an end user;
   computer-readable program code that is configured to receive at the end user device, broadcast programming;
   computer-readable program code that is configured to insert into the broadcast programming tat is received at the end user device, the selected content that corresponds to the data identifying characteristics of an end user, for presentation by the end user device; and
   computer-readable program code that is configured to gather at the end user device, data identifying that the selected content that corresponds to the data identifying characteristics of an end user was presented by the end user device.

42. A computer program product according to claim 41 wherein the content for insertion comprises advertising content for insertion within the broadcast programming.

43. A computer program product according to claim 42 wherein the computer-readable program code that is configured to identify at the end user device, selected advertising content for insertion within the broadcast programming comprises computer-readable program code that is configured to match data identifying a target audience for the advertising content to the characteristics of the end user.

44. A computer program product according to claim 41 wherein the end user device comprises a set top box.

45. A method according to claim 41 wherein the computer-readable program code that is configured to gather at an end user device, data identifying characteristics of an end user of the end user device, comprises computer-readable program code that is configured to gather at an end user device, data identifying at least one of the following characteristics of an end user: age, address, gender, marital status, income, interests, hobbies, purchasing habits, location and broadcast viewing habits.

46. A computer program product according to claim 41 wherein the computer-readable program code that is configured to gather at an end user device, data identifying characteristics of an end user of the end user device, comprises:
   computer-readable program code that is configured to identify a plurality of categories into which broadcast programming can be grouped; and
   computer-readable program code that is configured to determine a frequency and/or duration with which an end user is tuned to broadcast programming in the plurality of categories.

47. A computer program product according to claim 41 wherein the broadcast programming comprises satellite and/or cable broadcast programming.

48. A computer program product according to claim 41 wherein the computer-readable program code that is configured to receive at the end user device, content for insertion within the broadcast programming comprises computer-readable program code tat is configured to receive at the end user device from a broadband network, content for insertion within the broadcast programming.

49. A computer program product according to claim 41:
   wherein the computer-readable program code that is configured to receive at the end user device, broadcast programming comprises receiving at the end user device, broadcast programming including cue tones identifying locations where content may be inserted; and
   wherein the computer-readable program code that is configured to insert into the broadcast programming that is received at the end user device, the selected content that corresponds to the data identifying characteristics of an end user, is responsive to the cue tones.

50. A computer program product according to claim 41 further comprising:
   computer-readable program code that is configured to transmit from the end user device, the data identifying that the selected content that corresponds to the data identifying characteristics of an end user was presented by the end user device.

51. A computer program product for inserting content into broadcast programming, the computer program product comprising a computer usable storage medium having computer-readable program code embodied in the medium, the computer-readable program code executable by a computer processor comprising:
   computer-readable program code that is configured to gather at an end user device, data identifying characteristics of an end user of the end user device, wherein the data that is gathered is confined to the end user device;
   computer-readable program code that is configured to insert into broadcast programming that is received at the end user device, selected content that corresponds to the data identifying characteristics of the end user, for presentation; and
   computer-readable program code that is Configured to gather at the end user device, data identifying that the selected content that corresponds to the data identifying characteristics of an end user was presented.

52. A computer program product according to claim 51 wherein the content for insertion comprises advertising content for insertion within the broadcast programming.

53. A computer program product according to claim 51 wherein the end user device comprises a set top box.

54. A computer program product according to claim 51 wherein the computer-readable program code that is configured to gather at an end user device, data identifying characteristics of an end user of the end user device, comprises gathering at an end user device, data identifying at least one of the following characteristics of an end user: age, address, gender, marital status, income, interests, hobbies, purchasing habits, location and broadcast viewing habits.

55. A computer program product according to claim 51 wherein the computer-readable program code that is configured to gather ax an end user device, data identifying characteristics of an end user of the end user device, comprises:

computer-readable program code that is configured to identify a plurality of categories into which broadcast programming can be grouped; and computer-readable program code that is configured to determine a frequency and/or duration with which an end user is tuned to broadcast programming in the plurality of categories.

56. A computer program product according to claim 51 wherein the broadcast programming comprises satellite and/or cable broadcast programming.

\* \* \* \* \*

UNITED STATES PATENT AND TRADEMARK OFFICE
CERTIFICATE OF CORRECTION

PATENT NO. : 7,243,362 B2 Page 1 of 1
APPLICATION NO. : 11/218827
DATED : July 10, 2007
INVENTOR(S) : Swix et al.

It is certified that error appears in the above-identified patent and that said Letters Patent is hereby corrected as shown below:

In The Claims:

Column 8, Claim 10, Line 25:  Please correct "byte end"
                To read -- by the end--

Column 9, Claim 17, Line 9:  Please correct "user is timed"
                To read -- user is tuned--

Column 11, Claim 41, Line 23:  Please correct "the data tat"
                To read -- the data that--

Column 12, Claim 41, Line 36:  Please correct "programming tat is"
                To read -- programming that is--

Column 12, Claim 48, Line 18:  Please correct "program code tat is"
                To read -- program code that is--

Column 12, Claim 51, Line 56:  Please correct "that is Configured"
                To read -- that is configured--

Column 13, Claim 55, Line 9:  Please correct "to gather ax"
                To read -- to gather at--

Signed and Sealed this

Twenty-third Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 7,243,362 B2  Page 1 of 1
APPLICATION NO. : 11/218827
DATED : July 10, 2007
INVENTOR(S) : Swix et al.

It is certified that error appears in the above-identified patent and that said Letters Patent is hereby corrected as shown below:

In The Claims:

Column 8, Claim 10, Line 25: Please correct "byte end"
To read -- by the end --

Column 9, Claim 17, Line 9: Please correct "user is timed"
To read -- user is tuned --

Column 11, Claim 41, Line 23: Please correct "the data tat"
To read -- the data that --

Column 11, Claim 41, Line 36: Please correct "programming tat is"
To read -- programming that is --

Column 12, Claim 48, Line 18: Please correct "program code tat is"
To read -- program code that is --

Column 12, Claim 51, Line 56: Please correct "that is Configured"
To read -- that is configured --

Column 13, Claim 55, Line 9: Please correct "to gather ax"
To read -- to gather at --

This certificate supersedes the Certificate of Correction issued October 23, 2007.

Signed and Sealed this

Fourth Day of March, 2008

JON W. DUDAS
*Director of the United States Patent and Trademark Office*